United States Patent [19]

Vander Vegt et al.

[11] Patent Number: 5,193,207
[45] Date of Patent: Mar. 9, 1993

[54] LINK SORTED MEMORY

[75] Inventors: Stanley J. Vander Vegt, Los Angeles; Darrell W. Chan, Monterey Park, both of Calif.

[73] Assignee: Hughes Aircraft Company, Los Angeles, Calif.

[21] Appl. No.: 531,199

[22] Filed: May 31, 1990

[51] Int. Cl.[5] .................. G06F 15/74; G06F 13/00
[52] U.S. Cl. ......................... 395/800; 340/146.2; 395/600; 364/DIG. 1
[58] Field of Search ............... 364/200, 900, DIG. 1; 395/800, 600; 340/146.2

[56] References Cited

U.S. PATENT DOCUMENTS 4,030,077  6/1977  Florence et al. .................. 364/900
4,991,134  2/1990  Ivain ................................... 364/900

OTHER PUBLICATIONS

*Data Structures Using Pascal*, by Tenenbaum, et al. pp. 367-371, 408-413, copyright 1981.
Aaron M. Tenenbaum & Moshe J. Augenstein, Data Structures Using Pascal, 1981, pp. 158-251, Prentice Hall.

Primary Examiner—Lawrence E. Anderson
Attorney, Agent, or Firm—L. A. Alkov; W. K. Denson-Low

[57] ABSTRACT

A link sorted memory and method of storing and sorting data that provides for rapid sorting and retrieval of data stored in an unsorted fashion. The link sorted memory comprises a data memory for storing unsorted data, and a linking memory that functions as a pointer table to related memory addresses in the data memory. A sorting coprocessor is provided that stores the data unsorted in the data memory, scans the data words for a sort attribute, and uses the sort attribute to create the pointer table that links the unsorted stored data words. Sorting and retrieval of the unsorted data in the data memory is achieved by incrementing a counter, for example, that steps through the addresses stored in the linking memory to sequentially retrieve all data words having the sort parameter.

3 Claims, 2 Drawing Sheets

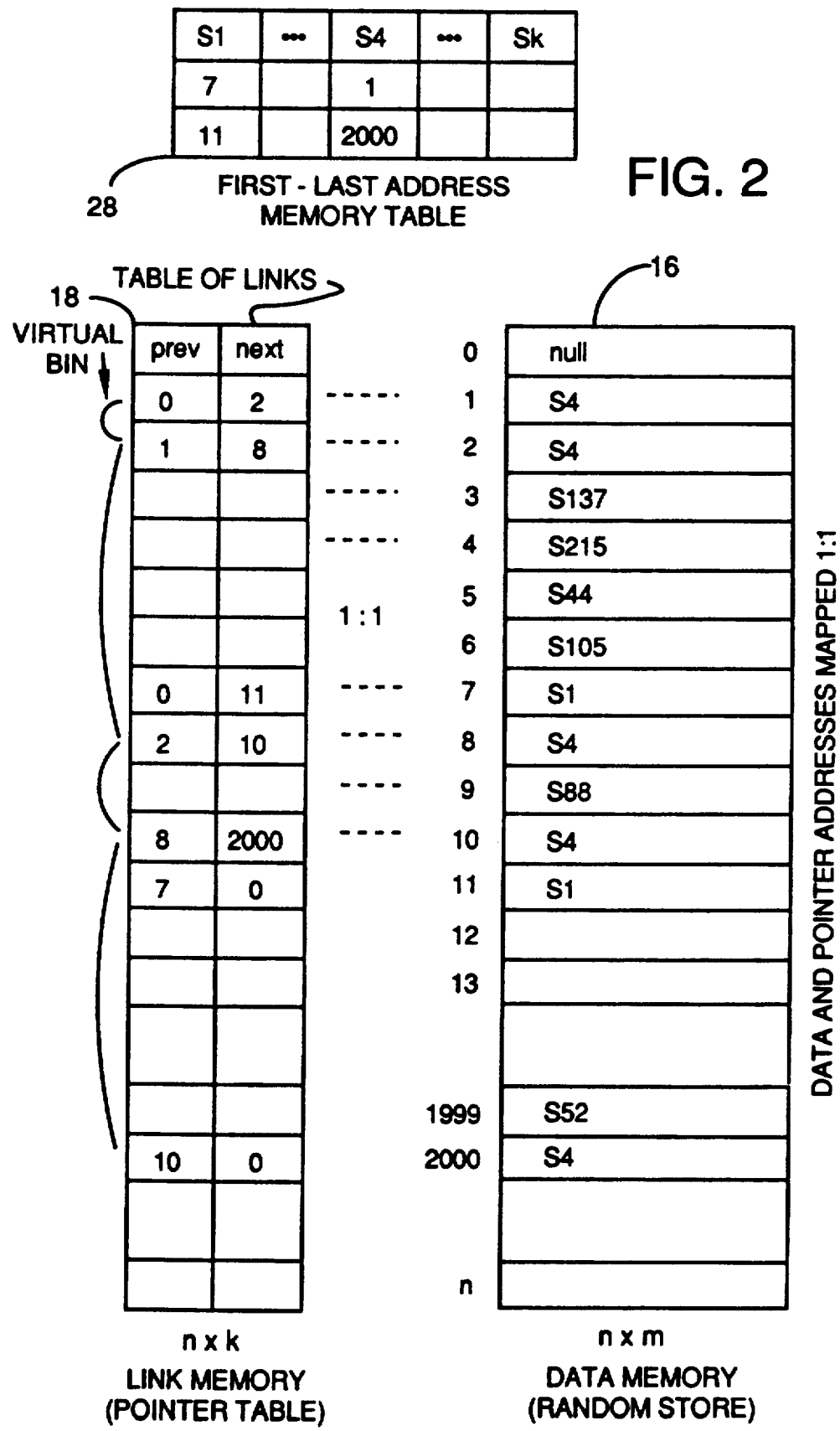

LINK SORTED MEMORY

BACKGROUND

The present invention relates generally to data sorting systems and methods, and more particularly, to data sorting accelerators and methods that use linking of data and dynamic allocation of memory to reduce memory and processing requirements.

Parameter sorting may be performed by general purpose processors, or special signal processing elements, which by the nature of their architecture compromise speed for broad functionality and programmability. Parameter sorting performed by parallel processing techniques demands significantly more processing hardware and memory and includes complex vectorization of the sorting process. This alternative is hardware efficient, fast, and still offers programming versatility.

Conventional sorting systems rearrange data to place the data in a desired sorted format. Such sorting conventionally involves allocating memory to accommodate worst case requirements for each sorted category and hence is inefficient in the use of memory resources. Such sorting also conventionally involves iterative searching for or arranging of data in memory and hence is inefficient in the use of processing resources. Such iterative searching includes binary or successive approximation searches.

SUMMARY OF THE INVENTION

In order to overcome the limitations of conventional sorting systems and methods, the present invention provides for a system and method of storing and sorting received unsorted data words. The system comprises a link sorted memory that includes a data memory that stores unsorted data words in consecutive memory address locations, and a linking memory that stores selected memory address locations related to each memory address location in the data memory. A sorting processor, or sorting coprocessor, is coupled to the data memory and to a linking memory, and receives unsorted data words containing predetermined sort parameters. Upon receipt, the sorting coprocessor scans the sort parameter field of each of the incoming data words to associate the data to a group, or more specifically, a virtual bin. The sorting coprocessor then writes the unsorted data words into the data memory at consecutive memory address locations. As each data word is stored, the sorting coprocessor builds a smaller secondary memory file that stores the address locations of the previous and subsequent data words that are associated with the same virtual bin determined by the value of the current data word sort parameter.

Typically, the received unsorted data words contain a predetermined plurality of sort parameters. The link sorted memory works in conjunction with a computer coupled to the sorting coprocessor that provides control signals that select a predetermined sort parameter to be scanned. The respective depths of the data memory and the linking memory are substantially the same.

One method in accordance with the present invention comprises the following steps. First, unsorted data words are received. Then the unsorted data words are stored in consecutive memory address locations. A selected field, or sort parameter, of each of the incoming data word is read. Based on the value of the sort parameter, each data word is associated to a group category, or virtual bin. The memory address of the current data word is stored as a forward reference relative to the location of the prior data word of the same virtual bin. The memory address of the prior data word of the same bin is stored as a backward reference relative to the location of the current data word. The stored memory address pairs (previous and next) provides for linking of the address locations for all data words within a range of the sort parameter. This linking or mapping of all data words belonging to sort parameter group is the essence of the virtual bin. A table of links is created by storing all the separate linking memory.

Sorting of the unsorted data words is achieved by employing the table of links. In particular, the memory address location of the first occurrence of a data word associated with a chosen virtual bin is retrieved. Then, the table of links is referenced to sequentially retrieve the remainder of data words of the virtual bin. This is accomplished by sequentially retrieving the data words located at memory address locations identified in the table of links until the last memory address location is referenced.

The link sorted memory, or sorting accelerator, of the present invention uses the linking memory as an array of pointers to quickly retrieve data randomly stored in the memory. More specifically, the present invention is an accelerator that significantly increases speed in sorting, storing, and retrieving data. The concept is unique in that the sorting is performed in a quasi fashion. When a data block is received, the data words are stored in an unsorted manner in consecutive memory locations. However, the received words are grouped into virtual bins by attribute comparison. The linking memory stores the addresses of the data words. These addresses, for each sort group, form an array of pointers.

The present invention is very efficient because the data words are stored in consecutive locations. The required memory size need only be large enough to store the total number of words in all sort groups. The virtual bins of the virtual memory file are dynamically allocated so that memory is guaranteed to all sort groups regardless of the individual group size distribution. Data storage is extremely fast since with consecutive location store, the addresses are predetermined and simply incremented. Similarly, retrieving a sort group is fast, since the pointer table always points to the next bin memory location. The speed enhancement provided by the present invention significantly reduces the processing requirement when employed with the system computer or control processor, resolving an often unmanageable timeline execution.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates conceptual representations of the virtual sort bins, linking table and memory address locations employed in the link sorted memory of FIG. 1.

DETAILED DESCRIPTION

Figure 1:
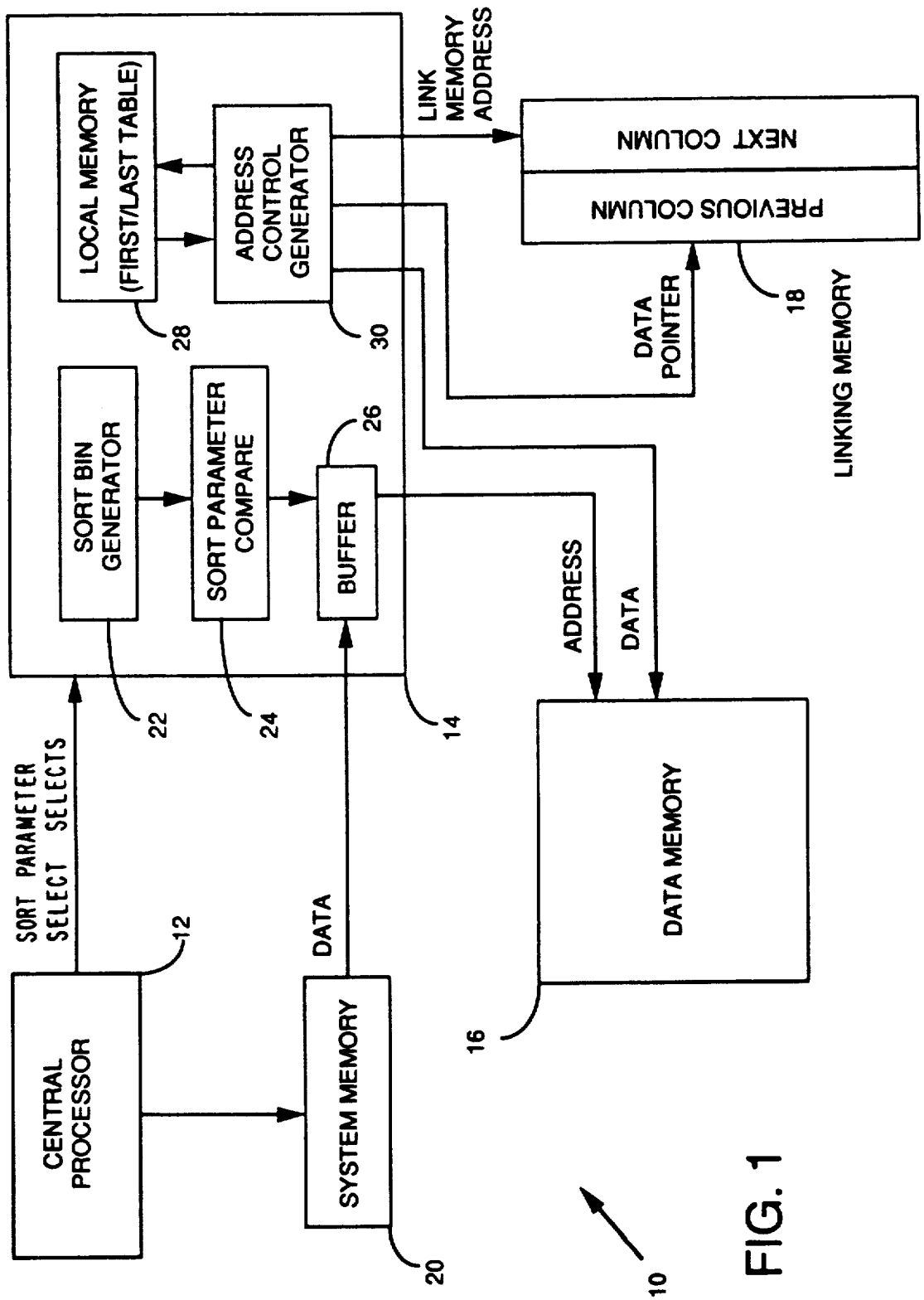
FIG. 1 illustrates a link sorted memory in accordance with the principles of the present invention.

Referring to FIGS. 1 and 2, they illustrate a link sorted memory 10 in accordance with the principles of the present invention, and conceptual representations of the virtual sort bins, linking table and memory address locations employed in the link sorted memory of FIG. 1, respectively. The link sorted memory 10 is a sorting accelerator that quickly sorts and retrieves randomly stored data. The link sorted memory 10 comprises sorting processor, or sorting coprocessor 14 that is coupled to a data memory 16 designed to store unsorted data words in consecutive memory address locations therein. A central processor 12 is coupled to the sorting coprocessor 14 and is employed to control the sorting operations by providing sort parameter selections signals thereto. A system memory 20 associated with the central processor 12 is coupled to the sorting coprocessor 14 by way of a buffer 26. The system memory 20 stores data that is to be sorted by the link sorted memory 10. A linking memory 18 is coupled to the sorting coprocessor 14 and provides a means for storing selected memory address locations related to each each memory address location in the data memory 16. It is to be understood that the system memory 20 and the data memory 16 may be the same memory element, and are described herein as distinct elements only for the purpose of understanding the principles of the present invention.

The sorting coprocessor 14 comprises a sort bin generator 22 that is adapted to receive the sort parameters from the central processor 12. Sort parameter comparison circuitry 24 is coupled to the sort bin generator 22 that compares the sort parameters identified in the sort parameter selection signals provided by the central processor 12 with the sort parameter field contained in the data word contained in the data words coupled from the system memory 20. The data words from the system memory 20 are coupled to the sort parameter comparison circuitry 24 by way of the buffer 26. The buffer 26 is a register or input/output port, for example, and is not another memory element. The sort bin generator 22 is coupled to a local memory 28 wherein the lowest and highest memory address locations of data words that contain the sort parameter, or for each of a plurality of sort parameters, to create a set of virtual memory bins. An address control generator 30 is coupled to the sort parameter comparison circuitry 24, the local memory 28, the linking memory 18 and the data memory 16, and is adapted to control the addressing of the various memories of the link sorted memory 10.

The sorting coprocessor 14 is coupled to the data memory 12 and to the linking memory 18, and is adapted to receive unsorted data words containing a predetermined sort parameter from the system memory 20. The sorting coprocessor 14 is adapted to scan a selected field of each of the incoming data words to find the predetermined sort parameter contained therein. The sorting coprocessor 14 is adapted to transfer the unsorted data words into the consecutive memory address locations in the data memory 16. The sorting coprocessor 14 is adapted to store the lowest and highest memory address locations of the data words that contain the predetermined sort parameter, or for each of a plurality of sort parameters, into the local memory 28 to create a set of virtual memory bins. For each memory address location in the data memory 16, the sorting coprocessor 14 stores the previous and subsequent address locations of data words containing the same predetermined sort parameter in the linking memory 18.

The linking memory 18 comprises two columns of locations, each having the same depth. The depth of the linking memory 18 is substantially the same as the depth of the data memory 16. The internal local memory 28 is large enough to store the first and last address locations for each of the virtual bins.

In operation, at the start of the process, the central processor 12 specifies a word's sort parameter and its subranges which determine the size and number of bins. FIG. 2 shows there are dimensions for k bins. As the data words are received, they are stored unsorted into consecutive data memory locations in the data memory 16. Each data word's sort parameter is read to determine if its value is within the range of one of the bins. In FIG. 2, the data memory 16 contains words that are members of subsets Sj that are dispersed in the store unsorted. The data word's memory address is then appended to the link memory list for the bin to which the data word is associated. For example, when the S4 word is stored at address 8, address 8 is written back to the previous S4 link location 2, as the next S4 pointer. Similarly, this previous link address 2, is written into the current link memory address 8, as a previous pointer. In this manner every word location in the data memory 16 references the address location for the previous or next address of the respective word member of the same bin Sj.

To retrieve the data associated with a particular bin Sj, access to the first or last pointer of the link is necessary. When the first data word of a bin Sj is recognized, its memory address is stored. Each time another data word of a given Sj bin is written to the data memory 16, its memory address location overwrites the stored address of the preceding word of the same bin to become the last pointer of the link. There are the same number of previous/next pointers as there are data words. When the first/last pointers are stored, there absolute values take the address of the data word. The linking memory 18 address for a previous/next pair, and the data memory 16 address for the corresponding data are the same.

More particularly, the link sorted memory 10 receives new data in block form from the system memory 20 and writes it into sequential memory locations of the data memory 16. Writing is fast because addressing is consecutive, requiring a simple counter increment, for example. Concurrently, as data is received and written into the data memory 16, the data words are screened for the predetermined sort parameter, which is one field of each data word. This predetermined sort parameter comprises a primary sorting attribute.

The linking memory 18 provides an array of pointers to virtual sort bins. The link sorted memory 10 associates each received data word with a bin, and as the data word is stored in the data memory 16, its memory address and the address of the previous bin member are appended to the linking memory 18. This creates a linked list of forward and backward references to addresses of the data words associated with each bin or sort group. During the retrieve cycle, it is not necessary to sift through the data memory 16 for matching data. Once a sort parameter is selected, the pointer table in the linking memory 18 provides a complete list, or map, of all addresses to data words stored in the data memory 16 having the desired subset range of the sort parameter. This design achieves memory efficiency because the dedicated size of the data memory 16 need only be as large as the expected data block size. Since the data is stored unsorted, there is no requirement to reserve space for worst case situations where data attributes are not uniformly distributed.

Referring again to FIG. 2, the efficiency gained by the use of the link sorted memory may be seen. One possible alternative conventional method of sorting the data words with comparable speed would be to store data groups into memory partitions. To have enough storage for nonuniform distributions of the data, memory would have to be provided so all partitions could store the total n data words. This is exceedingly memory intensive. However, with the link sorted memory 10, data group distribution is not an issue. The width of the data words may be wide, whereas the width of the linking memory 18 is the width of two pointer fields. The memory overhead for the link sorted memory 10 is much less than that required for multiple partitions of the full data memory 16.

The memory for each bin of the pointer table comprising the linking memory 14 is dynamically allocated. The first and last address location of each bin is saved. During a retrieve operation, the first address location points directly to the initial data word of a sort group stored in data memory 16 and its address at the beginning of the pointer table link list. The last, or highest, address is saved so that during random store a bin's end boundary address can be recovered instantly and immediately appended with a new entry. Again, memory usage is optimized since the linking memory 18 pointer table is one dimensional with a depth equal to the depth of the data memory 16 for storing the actual data. The first/last save eliminates dedicating every bin with the maximum possible memory depth. Clearly, the number of pointers cannot exceed the number of data words stored in the data memory 16. Essentially, the pointers to the sort bins in the linking memory 18 and the memory address of the data sort groups in the data memory 16 are mapped one to one.

The sorting accelerator of the present invention uses the linking memory 18 as an array of pointers to quickly retrieve data randomly stored in the data memory 16. More specifically, the present invention is an accelerator that significantly increases speed in sorting, storing, and retrieving data. The concept is unique in that the sorting is performed in a quasi fashion. When a data block is received, the data words are stored in an unsorted manner in consecutive memory locations. However, the received words are grouped into virtual bins by attribute comparison. The linking memory 18 stores the addresses of the data words. These addresses, for each sort group, form an array of pointers.

The present invention is very efficient because the data words are stored in consecutive locations. This means that the required memory size is only large enough to hold the total collection of all sort groups combined. The size of the virtual bins as well as their memory maps in the link memory are dynamically allocated so that memory is guaranteed to all sort groups regardless of the individual group size distribution. Data storage is extremely fast since with consecutive location store, the addresses are predetermined and simply incremented. Similarly, retrieving a sort group is fast, since the pointer table always points to the next bin memory location. This speed enhancement significantly reduces the processing requirement when employed with a system processor, resolving an often unmanageable timeline execution problem. The link sorted memory 10 is also configurable. The primary sort parameter of the data words may be programmed to any field using the external central processor 12. Since the binning of data is virtual, the first last table of the local memory 28 and the linking memory 18 may be dynamically configured as an n-dimensional array. The only limit is the real size of the local memory 28 implemented for the bin array.

The present invention also provides for methods of efficiently sorting and retrieving data. One method in accordance with the present invention comprises the following steps. The first step comprises receiving unsorted data words. Then the data words are stored unsorted in consecutive memory address locations. A selected field, or sort parameter, of each of the incoming data word is read. Based on the value of the sort parameter, each data word is associated to a group category or virtual bin. The memory address of the current data word is stored as a forward reference relative to the location of the prior data word of the same virtual bin. The memory address of the prior data word member of the same bin is stored as a backward reference relative to the location of the current data word. The previous and next memory address pairs stored provides linkage of the address locations for all data words within the range of the sort parameter. This linking or mapping of all data words belonging to sort parameter group is the essence of the virtual bin. A table of links is created by the storage of all the separate links in a separate linking memory.

Sorting of the unsorted data words is achieved by employing the table of links. In particular, the memory address location of the first occurrence of a data word associated with a chosen virtual bin is retrieved. Then, the table of links is referenced to sequentially retrieve the remainder of data words of the virtual bin. This is accomplished by sequentially retrieving the data words located at memory address locations identified in the table of links until the last memory address location is referenced.

Thus there has been described a new and improved link sorted memory and method of storing and sorting unsorted data. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A link sorted memory comprising:
   data memory means for storing unsorted data words in consecutive memory address locations;
   linking memory means for storing selected memory address locations related to each memory address location in the data memory means; and
   sorting means coupled to the data memory means and to the linking memory means, for receiving unsorting data words containing a predetermined sort parameter, for scanning a selected field of each of the incoming data words to find the predetermined sort parameter contained therein, for transferring the unsorted data words into consecutive memory address locations in the data memory means, for storing the lowest and highest memory address locations of the data words that contain the predetermined sort parameter, and for each memory address location in the data memory means, storing the previous and subsequent address locations of data words containing the same predetermined sort parameter in the linking memory means as a table of links, wherein the sorting means comprises:

sort bin generator means for receiving sort parameters, local memory means coupled to the sort bin generator means for storing the lowest and highest memory address locations of the data words that contain the predetermined sort parameter, sort parameter comparison means coupled to the sort bin generator means for scanning a selected field of each of the incoming data words to find the predetermined sort parameter contained therein, and address control generator means coupled to the sort parameter comparison means, the local memory means, the data memory means and the linking memory means for transferring the unsorted data words into the consecutive memory address locations in the data memory means and storing the previous and subsequent address locations of data words containing the same predetermined sort parameter in the linking memory means;

and whereby sorting of the unsorted data words is achieved by retrieving the memory address location from the linking memory means of the first occurrence of a data word associated with a chosen sort parameter, referencing the table of links to sequentially retrieve the remainder of data words having the sort parameter, which is accomplished by sequentially retrieving the data words located at memory address locations identified in the table of links of the linking memory means until the last memory address location is referenced.

2. The link sorted memory of claim 1 wherein the received unsorted data words contain a predetermined plurality of sort parameters, and wherein the link sorted memory further comprises computer means coupled to the sorting means for providing control signals thereto that select a predetermined sort parameter to be scanned thereby.

3. The link sorted memory of claim 2 wherein respective depths of the data memory means and the linking memory means are substantially the same.

* * * * *